Figure 1:
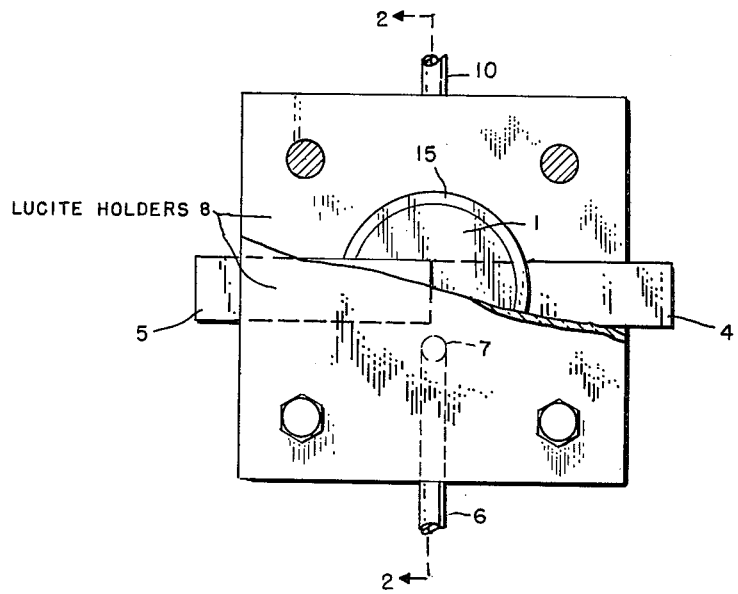

Dec. 12, 1961  H. F. HUNGER ET AL  3,013,098
FUEL CELL WITH CATION EXCHANGE RESIN
MEMBRANE AS ELECTROLYTE
Filed Oct. 3, 1960

INVENTORS,
HERBERT F. HUNGER
JAMES E. WYNN
BY Jack H. Linscott
ATTORNEY.

United States Patent Office 3,013,098
Patented Dec. 12, 1961

3,013,098
FUEL CELL WITH CATION EXCHANGE RESIN MEMBRANE AS ELECTROLYTE
Herbert F. Hunger, Long Branch, and James E. Wynn, Neptune, N.J., assignors to the United States of America as represented by the Secretary of the Army
Filed Oct. 3, 1960, Ser. No. 60,232
2 Claims. (Cl. 136—86)
(Granted under Title 35, U.S. Code (1952), sec. 266)

The invention described herein may be manufactured and used by or for the Government for governmental purposes without the payment of any royalty thereon.

This invention relates to fuel cells having a solvated cation exchange resin as the electrolyte.

Fuel cells have been defined as electrochemical devices in which part of the energy derived from a chemical reaction maintained by the continuous supply of chemical reactants, is converted to electrical energy.

It has been known to provide a fuel cell with a solvated ion exchange resin membrane as the electrolyte, positioned between the two electrodes, and to supply a gaseous fuel to one of the electrodes and an oxidant to the other electrode. Both anion and cation exchange resins have been used for this purpose.

It has also been known to construct a fuel cell having a liquid electrolyte for the adsorption and de-adsorption of ions of fuel and oxygen respectively, in which a liquid water soluble fuel is dissolved in the electrolyte and the mixture supplied to one of the electrodes while an oxidizing gas is passed to the other oxygen electrode.

Attempts of using liquid fuels in fuel cells having a solvated ion exchange resin membrane as the electrolyte have been unsuccessful since the resulting cells show rather low efficiency. We now have found that fuel cells having a solvated cation exchange resin membrane as the electrolyte give high efficiency if the liquid fuel consists of a mixture of an electrochemically oxidizable, liquid organic compound with an acid.

The invention is based on the discovery that in using a cation exchange resin membrane as the electrolyte it becomes necessary to have present, in the liquid fuel, an aqueous or nonaqueous acidic compound in order to increase the conductivity of the layer between the catalyst and the cation exchange resin. The resistance polarization will be decreased by the presence of protons in that layer. Generally speaking, any compound that is considered to be a proton donor can produce the above-described effect. However, sulfuric acid is considered to be the preferred acid because it contains an anion which is relatively difficult to polarize, as compared, for instance, with the chlorine in hydrochloric acid. A strongly polarizable anion would by preferentially adsorption at the catalyst surface on the electrode give rise to strong electrochemical polarization. The use of simple organic acids permits the operation of the cell at a higher pH and even permits the operation in high concentration with respect to the partial oxidation products of methanol or related fuels.

Figure 2:
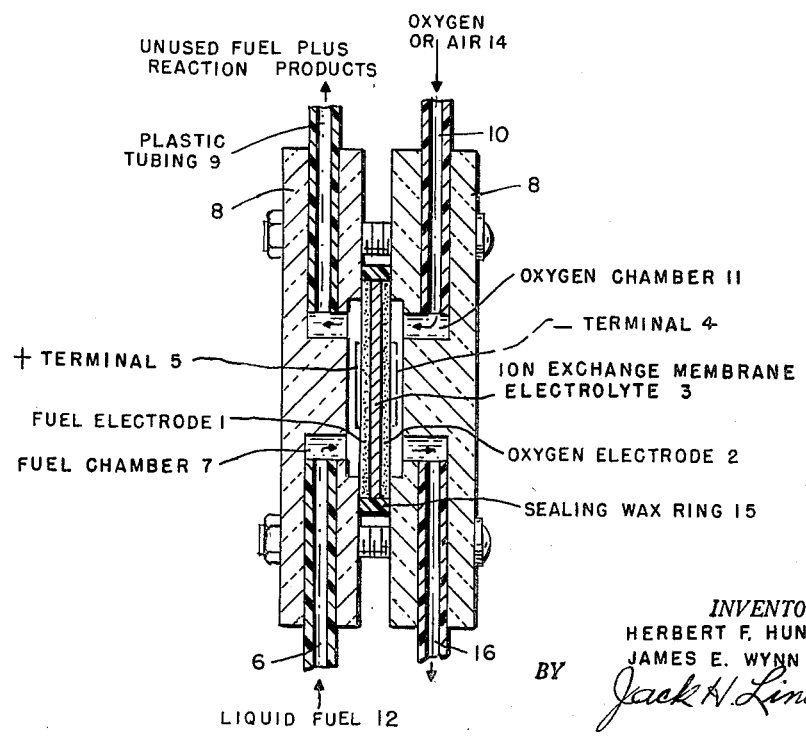

The invention will be illustrated in connection with a fuel cell shown in the accompanying drawing, in which FIG. 1 is a plan view partly in section, and FIG. 2 is a sectional view taken along the line 2—2 of FIG. 1.

The fuel cell shown in the drawing comprises a disc-shaped fuel electrode 1 and an equally disc-shaped oxygen electrode 2 separated by a solvated cation exchange membrane 3 which is in electrical contact with the electrodes 1 and 2. The membrane 3 consistutes the electrolyte to this fuel cell. The negative terminal 4 is connected to the oxygen electrode 2 and the positive terminal 5 to the negative fuel electrode 1. The liquid fuel 12 is supplied thru the plastic tubing 6 into the fuel chamber 7 which is provided in the lucite holders 8. After being at least partly used up the unused fuel portion plus the reaction products are forced to flow thru the plastic tubing 9. The gaseous oxygen or air 14 are introduced thru the tubing 10 into the oxygen chamber 11 and the unused portion of oxygen plus the reaction products are removed thru the tubing 16. A wax ring 15 provides a hermetic seal which prevents the escape of gases and liquids from the disc-shaped cell which is constituted by the two disc-shaped electrodes 1 and 2 separated by the equally disc-shaped cation exchange resin membrane 3 acting as the electrolyte.

The cation exchange resin membrane 3 may be made in various well-known ways. The cation exchange resin powder may be incorporated into a suitable binder such as polyethylene and made into sheet-like discs or the cation exchange resin itself may be formed into a membrane of the desired shape and structure, by molding or by casting a partially polymerized resin in membrane form and subsequently hardening the same.

Any appropriate type of electrodes may be used in this cell. Suitable electrodes are, for instance, the well-known highly porous, nickel or carbon electrodes provided with platinum black as the catalyst. Other electrodic or catalytic materials such as palladium, iridium and the like may also be used.

The following specific example illustrates the practice of the invention in using the above-described fuel cell:

A fuel mixture of methanol and sulfuric acid in the ratio of 1 ml. of methanol to 1 ml. of a 52% aqueous solution of sulfuric acid having a specific gravity of 1.42 is fed into the fuel chamber 7 of the cell. The cation exchange membrane electrolyte 3 is saturated before being incorporated into the cell with a 3 N solution of sulfuric acid. The fuel electrode 1 consists of a porous carbon disc provided with 1 mg. of platinum black per cm.$^2$ and the oxygen electrode 2 consists of an activated carbon disc provided with a catalyst consisting of silver oxide, cobalt oxide, and aluminum oxide and wet-proofed with a solution of 2 gm. of polyethylene in 100 ml. of carbon tetrachloride at 60° C. Oxygen 14 is supplied thru the tubing 10 to the oxygen electrode 2. The cation exchange membrane 3 consists of a polymer of polystyrene, cross-linked with diaryl benzene containing sulfuric acid as the active exchange sites. Such resins are commercially available.

The above-described cell has an open circuit voltage of about 0.5 volts measured with a Weston D.C. voltmeter having an internal resistance of 200 kilo ohms in the 1 volt range. The cell delivers at the operating voltage of 0.105 volt a current of 0.25 ma.

Instead of methanol other alcohols such as, for instance, ethanol or aldehyde such as formaldehyde may be used. Ketones, fatty acids, ketonic acids and hydroxy acids may also be used. Instead of sulfuric acid other mineral acids such as hydrochloric acid or simple organic acids such as formic or acetic acid may also be used.

It will be obvious to those skilled in the art of fuel cells that various other embodiments than those described may be used within the broad inventive idea as defined in the appended claims.

What is claimed is:

1. A fuel cell for the direct production of electrical energy from a liquid fuel comprising a solvated cation exchange resin membrane as the sole electrolyte, said membrane being positioned between two gas permeable electrodes, means for supplying a liquid fuel to the porous fuel electrode, said liquid fuel consisting of a mixture of methanol and a solution of sulfuric acid, said acid by being a proton donor increasing the conductivity of the layer between the catalyst on the surface of the electrodes and cation exchange resin, and means for supplying a gaseous oxidant to the porous oxygen electrode.

2. A fuel cell according to claim 1 in which the fuel consists of a mixture by volume of one part of methanol to one part of an aqueous solution of sulfuric acid of about 50%.

References Cited in the file of this patent
UNITED STATES PATENTS

| | | |
|---|---|---|
| 2,384,463 | Gunn et al. | Sept. 11, 1945 |
| 2,913,511 | Grubb | Nov. 17, 1959 |
| 2,925,454 | Juste et al. | Feb. 16, 1960 |